US008467355B2

(12) United States Patent
Herscovici et al.

(10) Patent No.: US 8,467,355 B2
(45) Date of Patent: *Jun. 18, 2013

(54) SYSTEM AND METHOD FOR PROVIDING WIRELESS LOCAL AREA NETWORKS AS A SERVICE

(75) Inventors: Bernard Herscovici, Kanata (CA); Stephen Rayment, Kanata (CA)

(73) Assignee: BelAir Networks Inc. (CA)

( * ) Notice: Subject to any disclaimer, the term of this patent is extended or adjusted under 35 U.S.C. 154(b) by 632 days.

This patent is subject to a terminal disclaimer.

(21) Appl. No.: 12/433,491

(22) Filed: Apr. 30, 2009

(65) Prior Publication Data

US 2010/0182984 A1 Jul. 22, 2010

Related U.S. Application Data (63) Continuation-in-part of application No. 12/358,049, filed on Jan. 22, 2009.

(51) Int. Cl.
*H04W 4/00* (2009.01)
*H04L 12/50* (2006.01)

(52) U.S. Cl.
USPC .......................................... 370/338; 370/360

(58) Field of Classification Search
USPC .......................................................... 370/338
See application file for complete search history.

(56) References Cited

U.S. PATENT DOCUMENTS

| | | | |
|---|---|---|---|
| 5,559,955 A | 9/1996 | Dev et al. | |
| 7,325,246 B1 * | 1/2008 | Halasz et al. | 726/2 |
| 7,420,956 B2 | 9/2008 | Karaoguz et al. | |
| 7,441,043 B1 | 10/2008 | Henry et al. | |
| 7,499,438 B2 * | 3/2009 | Hinman et al. | 370/338 |
| 7,596,614 B2 | 9/2009 | Saunderson et al. | |
| 7,639,656 B2 * | 12/2009 | Dooley et al. | 370/338 |
| 7,643,451 B2 | 1/2010 | He et al. | |
| 7,701,968 B2 | 4/2010 | Cheng | |
| 7,796,594 B2 * | 9/2010 | Melman et al. | 370/389 |
| 7,861,076 B2 | 12/2010 | Ponnapalli et al. | |
| 8,045,504 B2 * | 10/2011 | Bedekar et al. | 370/328 |
| 2004/0078598 A1 | 4/2004 | Barber et al. | |
| 2005/0141447 A1 * | 6/2005 | Carlton et al. | 370/328 |
| 2008/0043686 A1 * | 2/2008 | Sperti et al. | 370/338 |
| 2008/0175208 A1 * | 7/2008 | Oba et al. | 370/338 |
| 2008/0217391 A1 * | 9/2008 | Roof et al. | 235/375 |
| 2010/0290337 A1 * | 11/2010 | Suvi et al. | 370/217 |

FOREIGN PATENT DOCUMENTS

WO 2005/112598 A1 12/2005

OTHER PUBLICATIONS

International Search Report for International Application No. PCT/CA2010/00049, with a mailing date of Mar. 22, 2010.

(Continued)

*Primary Examiner* — Gerald Smarth
(74) *Attorney, Agent, or Firm* — Katten Muchin Rosenman LLP (57) ABSTRACT

A wireless local area network (WLAN) system is provided. The system comprises a WLAN network controller and a plurality of access points. The WLAN network controller is in communication with each of the plurality of access points via a transport data network. The WLAN network controller is configured to perform one or more network control functions for the benefit of the plurality of access points. The network control functions may be selected from management and operation, client authentication, mobility, and per-user administration. The WLAN network controller is remotely located and operated with respect to the plurality of access points.

30 Claims, 5 Drawing Sheets

OTHER PUBLICATIONS

Written Opinion of the International Searching Authority for International Application No. PCT/CA2010/00049, with a mailing date of Mar. 22, 2010.

International Preliminary Report on Patentability for International Application No. PCT/CA2010/00049, with a mailing date of Jul. 26, 2011.

Extended European Search Report for European Patent Application No. 10 733 160.5 with a mailing date of May 24, 2012.

Tatara Systems: "What is a Femtocell?", http://www.tatarasystems.com/ (Retrieved Dec. 1, 2011).

Tatara Systems: "The Benefits of Femtocells", http://www.tatarasystems.com/ (Retrieved Dec. 1, 2011).

Tatara Systems: "Femtocells: Why Now?", http://www.tatarasystems.com/ (Retrieved Dec. 1, 2011).

Tatara Systems: "Femtocell Architectures", http://www.tatarasystems.com/ (Retrieved Dec. 1, 2011).

GTP : Trillium GTP Software / Continuous Computing (CCPU), http://www.ccpu.com/trillium-protocol-software-products (Retrieved Dec. 1, 2011).

Femtocell Network Architecture—Airvana : http://www.airvana.com/technology/femtocell-network-architecture (Retrieved Dec. 1, 2011).

Femtocell . (n.d.). In Wikipedia. Retrieved Dec. 1, 2011, from http://en.wikipedia.org/w/index.php?title=Femtocell&oldid=461732259.

EE5517—Femtocells in 3G (CDMA2000 and UMTS), Mar. 28, 2011.

Seawright, Stephen, "Does the Market Really Need Femtocells?", Produce Design and Development, from http://www.pddnet.com/article-does-the-market-really-need-femtocells-102910/ (Retrieved Dec. 1, 2011).

* cited by examiner

SYSTEM AND METHOD FOR PROVIDING WIRELESS LOCAL AREA NETWORKS AS A SERVICE

CROSS-REFERENCE TO RELATED APPLICATIONS

The present application is a continuation-in-part of U.S. application Ser. No. 12/358,049, filed Jan. 22, 2009, the contents of which are incorporated herein by reference in their entirety.

BACKGROUND OF THE INVENTION

1. Field of the Invention

The present invention relates to wireless local area networks. More particularly, the present invention relates to a system that provides the use of a wireless local area network as a service to an owner of a venue desiring that network.

2. Description of the Related Art

Wireless Local Area Networks (WLANs) have been successfully deployed, initially in enterprise locations and subsequently residential and outdoor public locations, for well over a decade. The evolution of enterprise WLAN systems has gone from a) single Access Points (APs) to b) multiple autonomous APs interconnected typically via Ethernet to a conventional switch/router to c) most recently connecting the APs first to purpose-built on-site WLAN controllers and then to the router.

These on-site controllers were deployed, typically in the wiring closet of an enterprise, by Information Technology (IT) managers. The controller segregated nonsecure WLAN traffic from the secure wired network by authenticating wireless devices before they could access any core wired network services. They ensured physical security by removing any sensitive information "off the ceiling" (i.e., where the APs were located) to the equipment closet. They often provided a central secure source of powering for the APs. They provided for mobility between APs. Most importantly, they allowed centralized management of all WLAN operational aspects, such as security, privileges, upgrades, resource allocation, performance monitoring, etc.

With the recent trend toward outsourcing many IT functions to service providers, and toward providing web-based services and applications, on-site network controllers present obstacles to such service providers. Accordingly, there is a need for a system and method for providing WLAN capability and WLAN functionalities as a remotely operated service.

SUMMARY OF THE INVENTION

In one aspect, the invention provides a wireless local area network (WLAN) system. The system comprises a WLAN network controller and a plurality of access points. The WLAN network controller is in communication with each of the plurality of access points via a transport data network. The WLAN network controller is in communication with at least one additional server, which is co-located with one of the plurality of access points. The at least one additional server is configured to enable each of the plurality of access points to access an enterprise directory database. The enterprise directory database includes information relating to authorized users of the WLAN system. The WLAN network controller is in communication with the at least one additional server computer via a secured data link.

Each of the plurality of access points may be configured to automatically establish a connection to the WLAN network controller. Each of the plurality of access points may be capable of autonomously selecting a communications channel that enables the respective access point to communicate with at least one client device. The autonomous selection of a communication channel may entail selecting a channel with an acceptable amount of self network interference and an acceptable amount of external network interference.

A respective unique identifier may be assigned to each of the plurality of access points. The WLAN network controller may be further configured to use the respective unique identifier to authenticate the corresponding access point. The respective unique identifier may include at least one of a MAC address relating to the corresponding access point and a serial number relating to the corresponding access point, or other similar identifiers.

Each of the plurality of access points may be further configured to download network parameters from the WLAN network controller. The downloaded network parameters may include at least one power level and at least one beacon setting. The downloaded network parameters may be predetermined to enable operation of the WLAN system. Each of the plurality of access points may be capable of communicating with the transport data network via any one of a wired connection or a wireless mesh connection.

The WLAN network controller may be further configured to provide both secure private access and non-secure public access to the WLAN system. The WLAN network controller may be further configured to provide non-secure public access to the WLAN system by instructing at least one predetermined access point to transmit a visitor beacon and segregating traffic for visitor terminals that associate with the transmitted visitor beacon from a remainder of the WLAN by using one of a virtual local area network or traffic tunneling.

The WLAN network controller may be further configured to enable an on-site administrator to perform an administration portal function comprising at least one predetermined per-user administration task. The at least one predetermined per-user administration task may include at least one of enabling new users and providing guest access.

The WLAN network controller may be further configured to perform at least one of the additional server functions. The WLAN system may further comprise a local processor. The local processor may be coupled to each of the plurality of access points and in communication with the WLAN network controller via the transport data network. The local processor may be configured to perform at least one predetermined processing function.

In another aspect, the invention entails a method of providing a wireless local area network (WLAN) capability as a service. The method comprises the steps of: identifying a plurality of access points as belonging to a WLAN; communicating with each of the plurality of access points from a WLAN network controller at a remote location via a transport data network; remotely operating the WLAN by performing at least one network control function for benefit of the plurality of access points; and interfacing to at least one additional server computer, which is co-located with one of the plurality of access points and configured to enable each of the plurality of access points to access an enterprise directory database. The enterprise directory database includes information relating to authorized users of the WLAN. The WLAN network controller is in communication with the at least one additional server computer via a secured data link.

The method may further comprise the step of automatically downloading management and operational parameters to each of the plurality of access points. The management and operational parameters may include at least one radio frequency transmit power level and at least one beacon setting. The management and operational parameters may be configurable at the WLAN network controller.

The method may further comprise the step of automatically downloading at least one software image to at least one selected access point. The at least one selected access point may be capable of storing the at least one software image in a first operating bank and operating on the WLAN from a second operating bank. The WLAN network controller may be capable of controlling the first and second operating banks.

The method may further comprise the step of receiving information corresponding to selected local operational parameters from each of the plurality of access points, including at least one of receiving an operational alarm relating to a fault condition; receiving information relating to traffic throughput and loading; receiving information relating to one of self network interference or external network interference; and receiving information relating to radio coverage. The method may further comprise the step of applying a threshold to incoming operational alarms. The method may further comprise the step of logging parameters corresponding to the received information.

The method may further comprise the step of authenticating a client device to the WLAN network by transmitting a message to at least one access point, the message including information relating to the authenticating. The step of authenticating may further comprise tunneling a client device MAC address through the transport data network using a predetermined tunneling protocol. The client MAC address may be determined using a DHCP snooping operation being performed in the at least one access point.

The method may further comprise the steps of assigning a respective unique identifier to each of the plurality of access points; and using the respective unique identifier to authenticate the corresponding access point. The respective unique identifier may include either a MAC address relating to the corresponding access point or a serial number relating to the corresponding access point, or any other such identifier.

The method may further comprise the step of providing both secure private access and non-secure public access to the WLAN. The step of providing non-secure public access to the WLAN system may further comprise instructing at least one predetermined access point to transmit a visitor beacon and segregating traffic for visitor terminals that associate with the transmitted visitor beacon from a remainder of the WLAN by using one of a virtual local area network or traffic tunneling. The method may further comprise the step of enabling a user of a predetermined one of the plurality of access points to access an administration portal function, thereby enabling the user of the predetermined access point to administer the at least one network control function.

DETAILED DESCRIPTION OF THE INVENTION

With the recent trend toward outsourcing many IT functions to service providers, and toward providing web-based services and applications, the present inventors have recognized that an opportunity exists to "externalize" the WLAN controller functions as well. This trend is also in keeping with the recent moves to centralized "cloud computing" in which many IT-related capabilities are provided "as a service" from the Internet without customer knowledge of, expertise with, or control over the technology infrastructure that supports the capabilities. Historically, this evolution is similar to that of enterprise voice telephone systems, which initially used on-premise Private Automatic Branch Exchanges (PABX) and Electronic Key Telephone Systems (EKTS). Then, telephone companies also began to deliver feature-rich services from within the network using Centrex software and featured phones.

The opportunity exists with wireless local area networks (WLAN) for a service provider—wired or wireless—to own the WLAN equipment, deploy the WLAN equipment in the enterprise, and remotely operate and maintain that equipment, all for a monthly fee. Typically, a flat monthly fee will be paid, based on the area covered, the performance offered and so on, thus enabling a differentiated bronze/silver/gold "tariff" scheme. Such an approach eliminates any upfront capital cost for the enterprise. A further benefit of this approach is that it frees the Information Technology (IT) manager from the complexities of deploying and operating a wireless system, and it eliminates the risks and operating costs associated with equipment failures, performance shortfalls, and ongoing upgrades. The service provider performs continuous network monitoring of WLAN operation and performance on a 24-hours-per-day, seven-days-per-week basis, troubleshooting and repairing or replacing access points (APs) as required. The service provider adds or upgrades equipment to meet agreed coverage and capacity specifications, as stipulated in the service agreement with the customer.

This new "hosted" WLAN service affords an opportunity for the service provider to enter the enterprise data business, thereby creating a new incremental revenue stream. By centralizing operations across multiple customers, the service provider will typically be able to offer the service at very cost-competitive rates, as compared with the cost of an outright purchase.

In a system according to a preferred embodiment of the present invention, the architecture also allows for even an additional layer of indirection, where third parties, such as equipment vendors or system integrators, provide the network controllers and application software, hosted on their own computing platforms, to the service providers. The service providers, in turn, deal directly with the venue owners.

In accordance with a preferred embodiment of the present invention, these WLAN networks enable both secure private access for the user population within the enterprise as well as ready access for roaming visitors to the enterprise. In the latter case, the network appears to the visitor like a public "hotspot" consistent with that being provided by the service provider in a wide variety of other public areas. Such public access provides an additional revenue stream for the service provider that is deploying the managed network.

Functions

Controller

Figure 1:
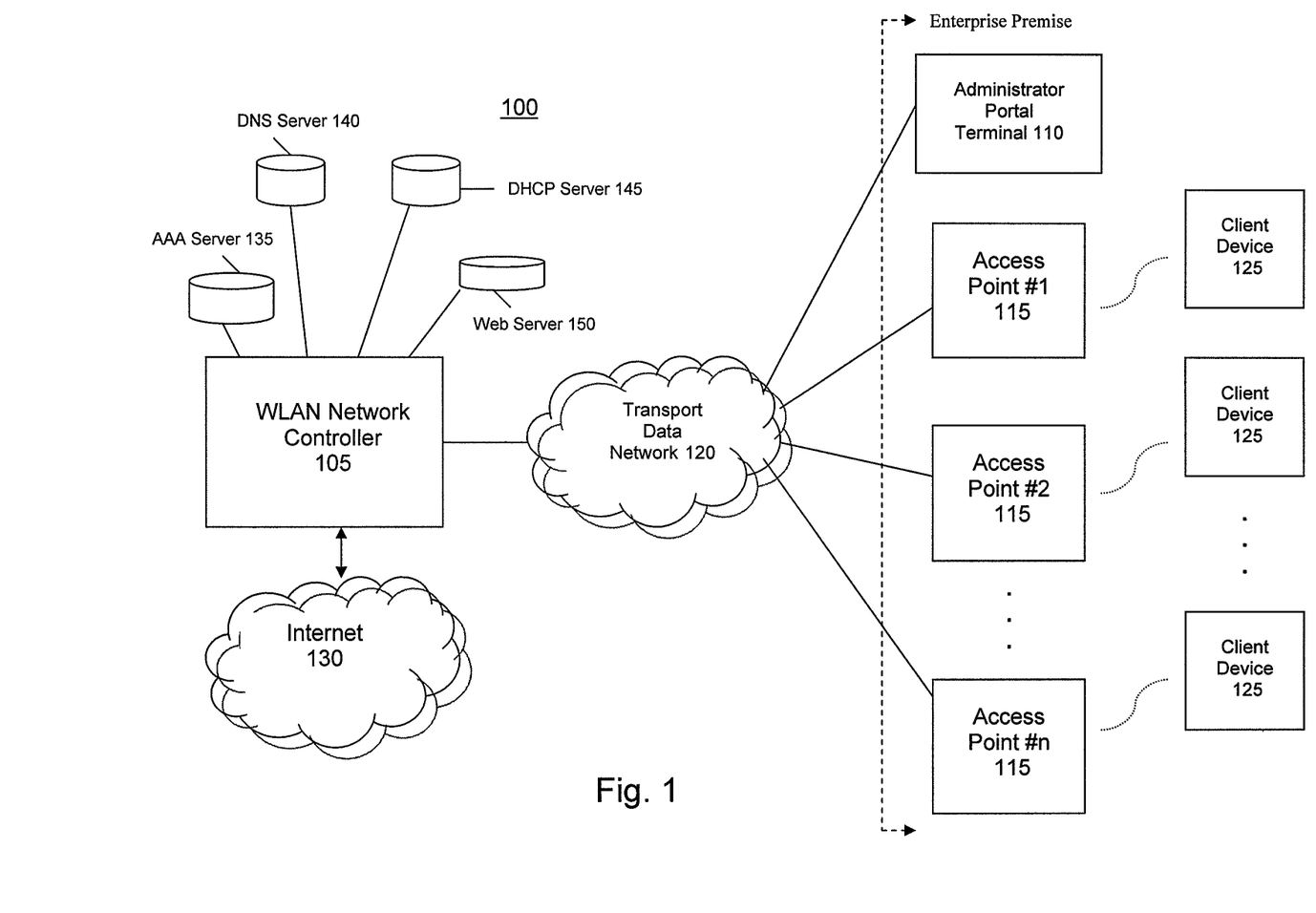
FIG. 1 illustrates a block diagram of a wireless local area network (WLAN) that uses a remotely located network controller, according to a preferred embodiment of the invention.

In a preferred embodiment of the present invention, referring to FIG. 1, a wireless local area network (WLAN) 100 includes access points (APs) 115 and an off-site WLAN network controller 105 that is connected to the APs 115 via a transport data network 120. The WLAN controller 105 is centrally located within the service provider's network 100. The network controller 105 performs all of the functions that are typically implemented by on-premise WLAN controllers for conventional WLANs; and the network controller 105 may also perform additional functions. This "hosted" network controller 105 can be owned and operated by the service provider; alternatively, the controller 105 can even be outsourced to a third party who provides the controller 105 and/or the management application software, which in turn are operated by the service provider.

Client devices 125 are connected to the WLAN network 100 via one or more APs 115. The WLAN 100 is also connected to the Internet 130 via the network controller 150 or directly via the transport data network 120.

The network controller 105 is preferably implemented by the use of one or more general purpose computers, such as, for example, a Dell PowerEdge, or a Hewlett-Packard ProLiant DL server. Client devices 125 are typically personal computers, such as laptop computers or handheld palm/personal digital assistant (PDA) devices. Each of the network controller 105, the APs 115, and the client devices 125 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), or the like. Each of the network controller 105, the APs 115, and the client devices 125 can also include computer memory, such as, for example, random-access memory (RAM) or EEPROM/Flash. However, the computer memory of the network controller 105 can be any type of computer memory or any other type of electronic storage medium that is located either internally or externally to the network controller 105, such as, for example, read-only memory (ROM), compact disc read-only memory (CDROM), electro-optical memory, magneto-optical memory, an electrically-erasable programmable read-only memory (EEPROM), or the like.

According to exemplary embodiments, the respective RAM or EEPROM can contain, for example, the operating program for any of the network controller 105, the APs 115, or the client devices 125. As will be appreciated based on the following description, the RAM can, for example, be programmed using conventional techniques known to those having ordinary skill in the art of computer programming. The actual source code or object code for carrying out the steps of, for example, a computer program can be stored in the RAM. Each of the network controller 105, the APs 115, and the client devices 125 can also include a database. The database can be any type of computer database for storing, maintaining, and allowing access to electronic information stored therein.

The network controller 105 functions are segregated into four major parts. The first part includes the management and operation of the physical network resources, which are typically performed by the service provider. The second part includes the provision of client authentication functions to limit network access to authorized users. The third part includes the provision of cross-location (often also referred to as "cross-subnet") mobility. A fourth set of functions includes the administration of all remaining "per-user" functions, which typically are performed by on-site IT personnel.

Management and Operation

The network controller 105 performs various configuration, fault monitoring, and performance monitoring functions, including the following:

Automatic download of all required configuration information to APs 115 at power-up/power cycle, including, for example:

Power levels

Beacon (Service Set Identifier or SSID) settings

Automatic upgrades of APs 115 to latest software loads, without intervention by on-site personnel     Remote commissioning of all APs 115

Continuous real time monitoring of network operation

All APs 115 are contacted regularly to ensure they are alive     All alarms from APs 115 are monitored in real-time     Thresholding of parameters being alarmed     Logging of events     Remote diagnosis of all APs 115

Continuous real-time monitoring of network performance, including, for example,     Throughput and loading     Interference—both self and external networks and devices     Coverage     All with thresholdable alarms     Logs of all selected parameters are maintained Client Authentication The network controller 105 provides for centralized client device conditional access to support user authentication, thereby simplifying operations and enabling scaling to large networks with many thousands of users. The authentication can be used to provide both private and public access to the network as desired.

Mobility

When APs 115 or groups of APs 115 are located in different buildings, different APs 115 within the same WLAN network may be connected to the transport network 120 via different routers and hence different IP subnets. To facilitate mobility of Layer-2 (e.g., Wi-Fi) devices across subnets, Layer-2 MAC address information must be communicated with the central network controller 105.

Per-User Administrator Access

In a preferred embodiment of the present invention, an administrator portal may be included, in order to enable on-site personnel to perform any required per-user administration tasks. Such tasks may include enabling new WLAN users and providing guest access to the WLAN. The administrator portal is preferably implemented as a web-based application running on the network controller 105, accessible to an on-site administrator via a conventional web browser.

Using the administrator portal 110, the on-site administrator can configure his particular enterprise account and setting, including information such as the following:

Site name and address

Network beacons (e.g., SSIDs)—broadcast or hidden

List of registered users

Other profiles

Additional Functions

Additional functions that may be performed by the network controller 105 include the following:

Per-user bandwidth rate limiting

Traffic prioritization

Content filtering

Client-to-client isolation

Intrusion detection and protection

AP load balancing

The network controller 105 is typically interfaced to additional network servers, such as:
- Web server 150 for authentication splash pages, advertising, etc.
- Remote Authentication Dial In User Service (RADIUS) server 135 for authentication, authorization, and accounting (AAA) purposes
- Dynamic Host Configuration Protocol (DHCP) server 145 for automatic client Internet Protocol (IP) address assignment
- Domain Name Service (DNS) server 140 for Internet name resolution
- Billing server
- Customer Relationship Management (CRM) server to track account and trouble ticket information
- Database (e.g., Structure Query Language—SQL) and interchange interfaces (e.g., Comma-Separated Values (CSV) files) for off-line processing of data Any or all of these servers may be integrated into the network controller 105 for smaller deployments, thereby simplifying and reducing the cost of such deployments.

In order to ease installation by non-IT personnel, such as electricians, the on-site APs 115 need only be provided with electrical power. In this case, the APs 115 are interconnected to form a path back to the wired connection point to the network 100 using wireless mesh radio connections.

Figure 2:
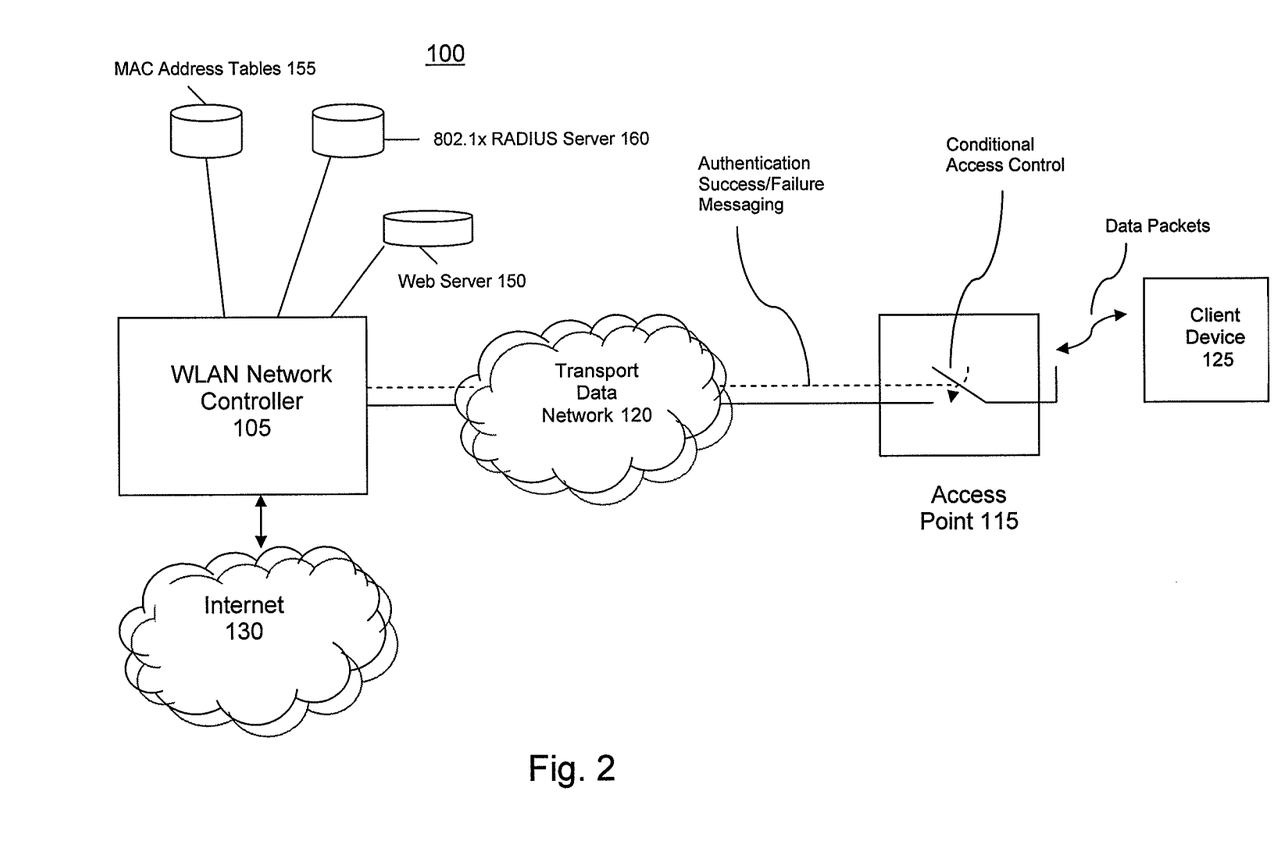
FIG. 2 illustrates a block diagram for communications within the WLAN of FIG. 1 using a conditional access control switch that is controlled by an authentication message sent to an access point, according to a preferred embodiment of the invention.

In a preferred embodiment of the invention, the APs 115 allow for each of the following:
- Both wired and wireless mesh connections of the APs 115 back to the wired connection point to the network 100. Wired connection is automatically selected if present, with fall back to wireless mesh connections between APs 115 if the APs 115 are so enabled
- Fully automatic configuration of operational parameters, including channel selection to minimize self and adjacent network interference
- Fully automatic discovery by the network controller 105
- Each AP 115 has a unique identifier assigned by the service provider (e.g., a serial number or Media Access Control (MAC) address, stored in MAC Address server 155 as shown in FIG. 2) which is used to authenticate the AP 115 with the network controller 105 on power-up
- Automatic download of all running configuration parameters, including power levels, beacon (SSID) settings, etc.
- APs 115 may have dual memory banks, thus allowing one memory bank to receive downloads from the controller while the AP continues to execute from the other memory bank
- Upgrades may then be performed at scheduled maintenance windows by simply switching the active memory bank Architecture Referring to FIG. 1, in accordance with a preferred embodiment of the present invention, the APs 115 are connected to a transport data network 120 either directly (e.g., via a digital subscriber line (DSL) or cable modem) or, when there are multiple AP's 115 per location, via an on-premise switch (not shown). Typically, data traffic is routed directly to its destination via the transport data network 120 and then the Internet 130, although, for some applications, the data traffic may be "tromboned" through the network controller 105 for mobility purposes, as further described below.

Each AP 115 implements the conditional access function, whereby no user traffic is enabled onto the network 100 until the user client device is authenticated. The conditional access function is similar to the function performed by IEEE 802.1x Authenticator devices. In a preferred embodiment of the present invention, the conditional access function is performed regardless of the type of authentication being performed. There are several different authentication schemes which may be used, including the following: MAC address "white list" authentication; web page redirect authentication; and IEEE 802.1x (username/password) authentication.

Referring to FIG. 2, in a preferred embodiment of the present invention, the APs 115 perform the conditional access function, ignoring all data packets from clients (also referred to as "supplicants") until the network controller 105 signals successful authentication of the user, at which time data traffic is enabled on to the network 100 by the AP 115. For the case in which MAC authentication is employed, MAC addresses are forwarded from server 155 to the network controller 105 for validation, as further described below. For the cases of web redirect and 802.1x authentication, messaging, as used in Extensible Authentication Protocol (EAP) or bespoke html messages, is used to communicate between the AP 115 and the network controller 105 regardless of which authentication method being used by the network controller 105. Both of the 802.1x RADIUS server 160 and the web server 150 are interfaced centrally by the network controller 105. Further this same approach can be extended for use with a variety of other authentication schemes. The various schemes are needed to satisfy the needs of both private and public network access control.

Figure 3:
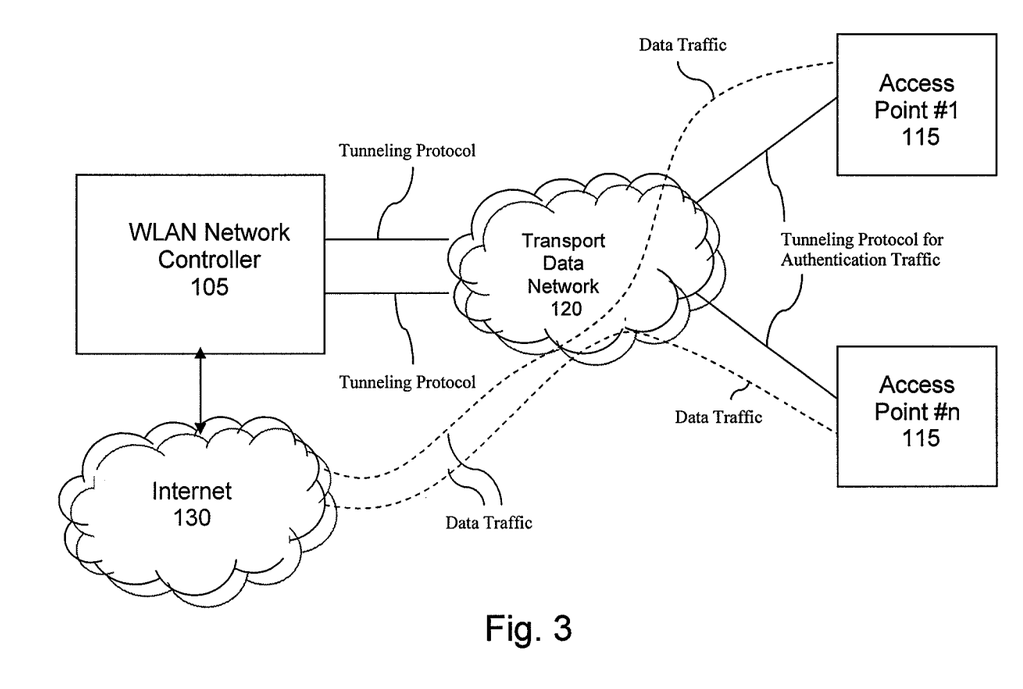
FIG. 3 illustrates a block diagram for communications within the WLAN of FIG. 1 using a tunneling protocol for authentication traffic, according to a preferred embodiment of the invention.

Referring to FIG. 3, client MAC address information, as required for MAC authentication, can be communicated to the centralized network controller 105 in several ways, including DHCP snooping, which allows for inspection of incoming MAC addresses, or by tunneling. Any of these communication modes may be used to enable the MAC address information to traverse the network 100 back to the network controller 105. Tunneling may be performed by any of a variety of protocols, including Layer 2 Tunneling Protocol (L2TP), Generic Routing Encapsulation (GRE), or other similar techniques. For example, where L2TP is used, the AP 115 performs the L2TP Access Control (LAC) function, while the network controller 105 performs the L2TP Network Server (LNS) function. Often, the tunneling protocols offer the additional benefit of providing an encrypted link between the AP 115 and the network controller 105.

Figure 4:
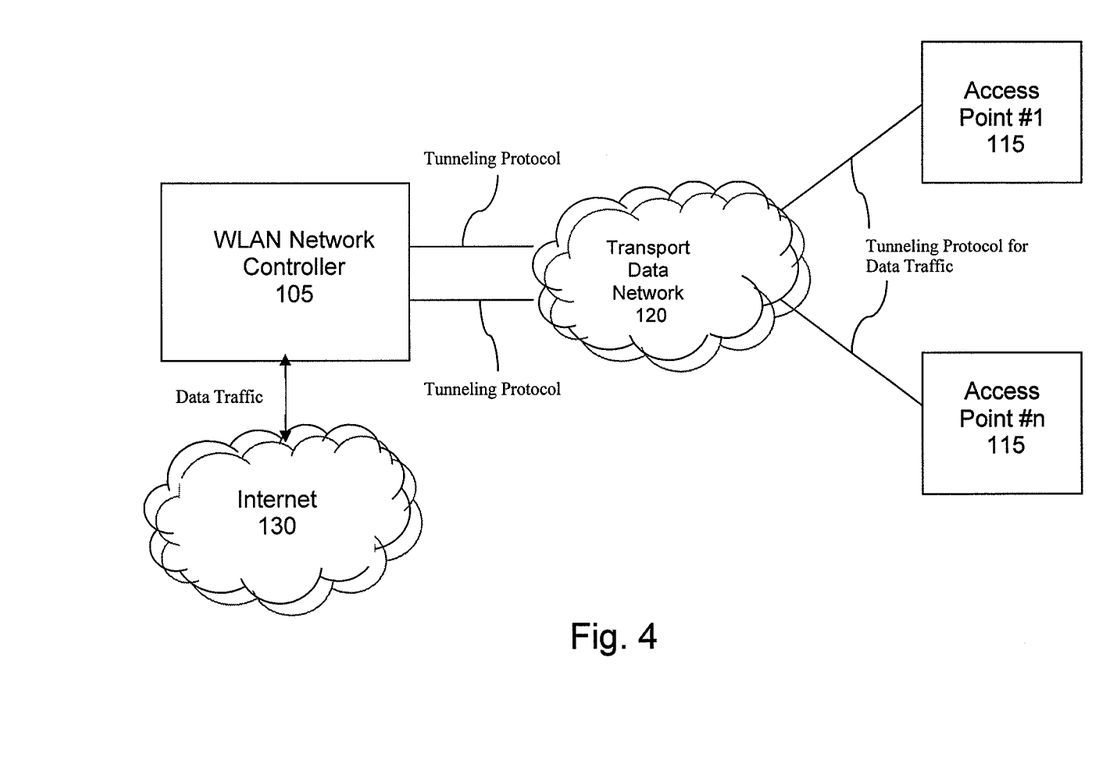
FIG. 4 illustrates a block diagram for communications within the WLAN of FIG. 1 using a tunneling protocol for data traffic, according to a preferred embodiment of the invention.

Referring also to FIG. 4, for situations in which client mobility across APs 115 or across network locations is desired, tunneling protocols may be further employed to forward all client MAC addresses between Tunnel End Points (TEPs) from the APs 115. In this configuration, preferably all traffic is tunneled to the network controller 105. The network controller 105 uses standard MAC address-based forwarding techniques, such as Rapid Spanning Tree Protocol (RSTP), to ensure that packets are forwarded to the appropriate switch port for delivery to the appropriate location and AP 115. IP addresses of the client devices are not required to change as clients move from one AP 115 or one network location to another, regardless of the IP routing configuration used to interconnect each of those locations to the transport data network 120. However, scaling a large Layer-2 forwarded network requires that several aspects be properly accounted for, including MAC address table sizes, bridge configuration and learning, broadcast filtering, and other relevant factors.

In a preferred embodiment of the present invention, the computer hardware that is employed as the network controller 105 is typically selected from the variety of industry standard computing platforms, with possible hardware acceleration in large networks for tunnel end points. Key attributes include:
- A rack-mount network computing appliance
- Optional hardware acceleration, e.g., for tunnel end point encryption functions
- High speed core network interfaces, such as, for example, 10 GigEthernet Local 10/100/1000BaseT Ethernet and other industry standard computing interfaces such as Peripheral Component Interconnect (PCI) and Universal Serial Bus (USB) Industry standard operating system software such as Windows, Linux and Solaris For situations in which the size of the network 100 does not justify investment in a fully centralized network controller 105—such as, for example, a small provider, a highly localized deployment, or inadequate connectivity from the enterprise to the network—all of the same functions can be provided by a local on-site version of the network controller 105. Such a local network controller 105 may still be remotely accessed and operated by the service provider.

In very large networks 100, the network controller 105 functions may be distributed, with low level functions, such as data collection, being performed by using on-site equipment, and top-level coordination and analysis of the per-site devices being performed centrally at the remote network controller 105. A specific example of this is where the DHCP client IP address assignment function is performed locally within the APs 115, for example, to reduce the number of unique addresses required across the entire network. In this example, a Network Address Translation (NAT) function is also performed in the AP to isolate local addresses.

Figure 5:
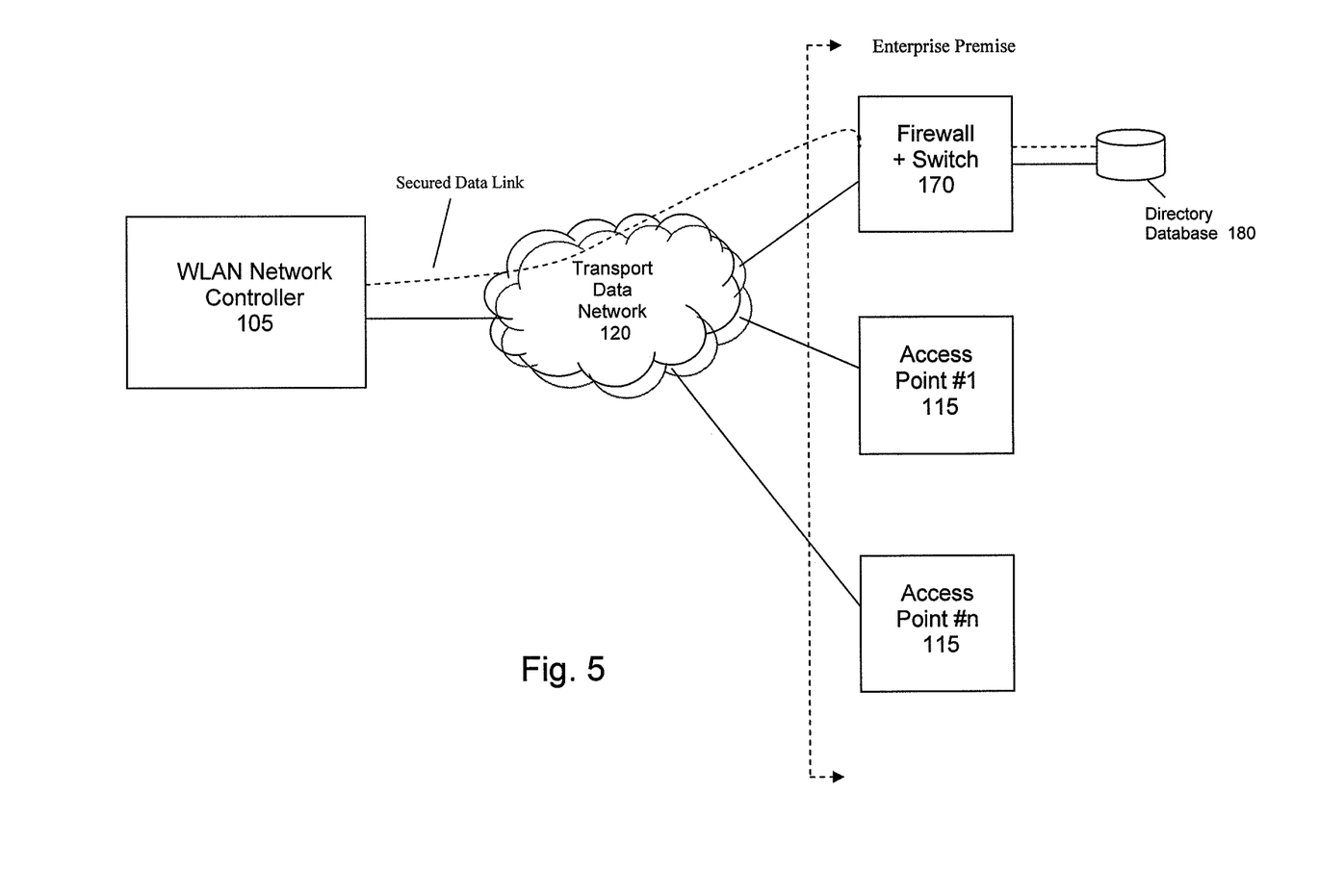
FIG. 5 illustrates a block diagram for communications within the WLAN of FIG. 1 using a directory database that is securely maintained behind the firewall of an enterprise, according to a preferred embodiment of the invention.

Referring to FIG. 5, another example of a situation in which the network controller function is distributed is illustrated in a block diagram showing that the network controller uses one or more enterprise directory databases 180 to maintain information about authorized users of the wireless network. In many enterprises, servers such as Lightweight Directory Access Protocol (LDAP) and Active Directory (AD) are securely maintained behind the enterprise's firewall 170 and are used to maintain the list of authorized users of the existing network. The network controller is treated as a trusted partner of the enterprise and is granted remote access to the enterprise directory, for example using Active Directory Federation Services. Using these services, the network controller 105 would remotely access the enterprise's directory database 180 using a secured data link rather than duplicating the contents of the database in the service provider's central location. The directory database(s) 180 may be located at any number of branch locations or at one centralized headquarters location and are used by the network controller 105 to authorize access at all locations.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. A wireless local area network (WLAN) control system, comprising:
a WLAN network controller; and a plurality of access points on-site of the WLAN, the WLAN network controller being (i) located at a service provider off-site of the WLAN, and (ii) in communication with each of the plurality of on-site WLAN access points via a wired transport data network, substantially all WLAN network control functions for the plurality of on-site WLAN access points being provided by said WLAN network controller and external of the WLAN, the substantially all WLAN network control functions including at least (i) management and operation of physical network resources, (ii) provision of client authentication functions to limit network access to authorized users, (iii) provision of cross-subnet mobility, and (iv) administration of per-user functions, and wherein the plurality of access points are not disposed at the service provider location; and wherein the WLAN network controller is in communication, via the wired transport data network, with at least one additional server, the at least one additional server being (i) co-located with at least one of the plurality of on-site WLAN access points and (ii) configured to access an enterprise directory database, the enterprise directory database including information relating to authorized users of the WLAN system; and wherein the off-site WLAN network controller is in communication with the at least one additional server computer via a secured data link.

2. The system according to claim 1, wherein the off-site WLAN network controller is configured to automatically download configuration information to the plurality of access points.

3. The system according to claim 1, wherein the off-site WLAN network controller is configured to perform the additional functions of (1) per-user bandwidth rate limiting, (2) traffic prioritization; (3) content filtering, and (4) intrusion detection.

4. The system according to claim 1, wherein each of the plurality of access points is configured to automatically establish a connection to the off-site WLAN network controller via the wired transport data network.

5. The system according to claim 1, wherein each of the plurality of access points is configured to autonomously select a communications channel that enables said each access point to communicate with at least one client device, the autonomous selection of the communication channel including selecting a channel with (i) a predetermined amount of self network interference and (ii) a predetermined amount of external network interference.

6. The system according to claim 1, wherein each of the plurality of access points has a respective unique identifier, and wherein the off-site WLAN network controller is configured to use the respective unique identifier to authenticate the corresponding access point.

7. The system according to claim 6, wherein the respective unique identifier includes at least one of a MAC address and a serial number.

8. The system according to claim 1, wherein each of the plurality of access points is configured to download network parameters from the off-site WLAN network controller, wherein the downloaded network parameters include at least one power level and at least one beacon setting.

9. The system according to claim 8, wherein the downloaded network parameters are predetermined to enable operation of the WLAN system.

10. The system according to claim 1, wherein each of the plurality of access points is configured to communicate with the transport data network via at least one of a wired connection and a wireless mesh connection.

11. The system according to claim 1, wherein each of the plurality of access points is configured to provide both secure private access and non-secure public access to the WLAN system.

12. The system according to claim 11, wherein each of the plurality of access points is configured to provide non-secure public access to the WLAN system by instructing at least one predetermined access point to transmit a visitor beacon and segregating traffic for visitor terminals that associate with the transmitted visitor beacon from a remainder of the WLAN by using at least one of a virtual local area network and traffic tunneling.

13. The system according to claim 1, wherein each of the plurality of access points is configured to enable an on-site administrator to perform an administration portal function comprising at least one predetermined per-user administration task, wherein the at least one predetermined per-user administration task includes at least one of enabling Previously Presented users and providing guest access.

14. The system according to claim 1, wherein each of the plurality of access points is configured to perform at least one of the additional server functions.

15. The system according to claim 1, wherein the WLAN system further comprises a local processor, and wherein the local processor is coupled to each of the plurality of access points and in communication with the off-site WLAN network controller via the transport data network.

16. A method of providing a wireless local area network (WLAN) control capability as a service, the method comprising the steps of:
    identifying a plurality of access points as (i) belonging to a WLAN owner and (ii) on-site of the WLAN;
    a service provider, different from the WLAN network owner, communicating with each of the plurality of access points from an off-site WLAN network controller at a remote location via a wired transport data network, the off-site WLAN network controller being disposed at a service provider location which is remote from (i) the WLAN and (ii) the plurality of on-site access points, which are not disposed at the service provider off site WLAN network controller location; and the service provider remotely operating the WLAN by performing substantially all network control functions for benefit of the plurality of on-site access points, substantially all WLAN network control functions being performed external of the WLAN, the substantially all WLAN network control functions including at least (i) management and operation of physical network resources, (ii) provision of client authentication functions to limit network access to authorized users, (iii) provision of cross-subnet mobility, and (iv) administration of per-user functions; and
    the service provider interfacing the off-site WLAN network controller to at least one additional server computer, the at least one additional server computer being (i) co-located with at least one of the plurality of on-site access points and (ii) configured to access an enterprise directory database, the enterprise directory database including information relating to authorized users of the WLAN; and wherein the off-site WLAN network controller is in communication with the at least one additional server computer via a secured data link.

17. The method according to claim 16, wherein the off-site WLAN network controller is configured to automatically download configuration information to the plurality of access points.

18. The method according to claim 16, wherein the off-site WLAN network controller performs the additional functions of (1) per-user bandwidth rate limiting, (2) traffic prioritization; (3) content filtering, and (4) intrusion detection.

19. The method according to claim 16, wherein each of the plurality of access points automatically establishes a connection to the off-site WLAN network controller via the wired transport data network.

20. The method according to claim 16, wherein each of the plurality of access points autonomously selects a communications channel that enables said each access point to communicate with at least one client device, the autonomous selection of the communication channel including selecting a channel with (i) a predetermined amount of self network interference and (ii) a predetermined amount of external network interference.

21. The method according to claim 16, wherein each of the plurality of access points has a respective unique identifier, and wherein the off-site WLAN network controller uses the respective unique identifier to authenticate the corresponding access point.

22. The method according to claim 21, wherein the respective unique identifier includes at least one of a MAC address and a serial number.

23. The method according to claim 16, wherein each of the plurality of access points downloads network parameters from the off-site WLAN network controller, wherein the downloaded network parameters include at least one power level and at least one beacon setting.

24. The method according to claim 23, wherein the downloaded network parameters are predetermined to enable operation of the WLAN system.

25. The method according to claim 16, wherein each of the plurality of access points communicates with the transport data network via at least one of a wired connection and a wireless mesh connection.

26. The method according to claim 16, wherein each of the plurality of access points provides both secure private access and non-secure public access to the WLAN system.

27. The method according to claim 26, wherein each of the plurality of access points provides non-secure public access to the WLAN system by instructing at least one predetermined access point to transmit a visitor beacon and segregating traffic for visitor terminals that associate with the transmitted visitor beacon from a remainder of the WLAN by using at least one of a virtual local area network and traffic tunneling.

28. The method according to claim 16, wherein each of the plurality of access points enables an on-site administrator to perform an administration portal function comprising at least one predetermined per-user administration task, wherein the at least one predetermined per-user administration task includes at least one of enabling Previously Presented users and providing guest access.

29. The method according to claim 16, wherein each of the plurality of access points performs at least one of the additional server functions.

30. The method according to claim 16, wherein the WLAN system further comprises a local processor, and wherein the local processor is coupled to each of the plurality of access points and in communication with the off-site WLAN network controller via the transport data network.

* * * * *

UNITED STATES PATENT AND TRADEMARK OFFICE
CERTIFICATE OF CORRECTION

PATENT NO. : 8,467,355 B2  
APPLICATION NO. : 12/433491  
DATED : June 18, 2013  
INVENTOR(S) : Herscovici et al.

Page 1 of 1

It is certified that error appears in the above-identified patent and that said Letters Patent is hereby corrected as shown below:

In the Specification

In Column 5, Line 23, delete "controller 150" and insert -- controller 105 --, therefor.

In the Claims

In Column 11, Lines 9-10, in Claim 13, delete "Previously Presented" and insert -- new --, therefor.

In Column 12, Line 51, in Claim 28, delete "Previously Presented" and insert -- new --, therefor.

Signed and Sealed this  
Thirty-first Day of December, 2013

Margaret A. Focarino  
*Commissioner for Patents of the United States Patent and Trademark Office*